United States Patent [19]

Brown

[11] Patent Number: 4,547,822
[45] Date of Patent: Oct. 15, 1985

[54] HEAD POSITIONING SERVO FOR DISK DRIVES

[75] Inventor: Stewart C. Brown, Newport Beach, Calif.

[73] Assignee: Tecstor, Inc., Huntington Beach, Calif.

[21] Appl. No.: 520,149

[22] Filed: Aug. 4, 1983

[51] Int. Cl.⁴ ............................................... G11B 5/55
[52] U.S. Cl. ..................................................... 360/78
[58] Field of Search ................. 360/78; 318/561, 592, 318/594, 596

[56] References Cited
U.S. PATENT DOCUMENTS
4,333,117 6/1982 Johnson ............................... 360/78

Primary Examiner—George G. Stellar
Attorney, Agent, or Firm—Knobbe, Martens, Olson & Bear

[57] ABSTRACT

There is disclosed herein a head positioning system for a disk drive for a computer utilizing a digital head positioning system with controlled acceleration profiles during both positive and negative acceleration. Non-volatile memory stores data regarding scheduled track crossings during a seek movement. These data are the times of actual track crossings and an error signal is generated to conform the actual head acceleration to the stored acceleration profile.

18 Claims, 9 Drawing Figures

HEAD POSITIONING SERVO FOR DISK DRIVES

BACKGROUND OF THE INVENTION

The invention relates to the field of disk drive memory devices, and, more particularly to magnetic head positioning servo control units for disk drives.

In conventional disk drives the magnetic head assembly is positioned by determining the seek length, i.e., the number of magnetic tracks on the surface of the disk which must be crossed, and then allowing uncontrolled positive acceleration of a servo arm bearing a magnetic head during the first uncontrolled part of the seek motion. A position sensor on the magnetic head assembly generates a track position signal which is differentiated by an electronic circuit to estimate the actual velocity of the head.

When certain criteria of track position and velocity are reached, the conventional systems begin to slow the head assembly servo arm down. Ideally, the deceleration profile should result in a slow down of the head to exactly zero velocity exactly as the head assembly arrives over the desired track, i.e., no overshoot. A predetermined deceleration profile is used for the last part of the trip, but the profile relates position to velocity according to a parametric position versus velocity equation where time is eliminated as a variable. The estimated velocity computed from the position data is then compared to a desired velocity for that position and an error signal is generated.

The conventional design has several disadvantages. For one, the uncontrolled positive acceleration means that there is no precise schedule for the acceleration as a function of time. The amount of power dissipated as heat in a servo coil is a function of $(1/T)^4$ where T is time to complete the seek. If there is no precise time schedule for the positive acceleration portion more power is supplied to the servo coil than for controlled acceleration. This power translates to heat Further, the calculation of velocity in these conventional units leads to velocity figures which can be quite inaccurate. Because of this inaccuracy, the head assemblies sometimes undershoot or overshoot their target tracks at the end of the deceleration profile, i.e., the actual velocity differs from the velocity calculated by the system which controls the deceleration profile. The result is that when the profile velocity is supposed to be zero and the head is supposed to be "on track", the head has either stopped short of the target or is still moving and moves past the target. These undershoots and overshoots take time to correct, which means that more power must be supplied to make the entire servo movement faster to make up for the sometimes inaccurate calculated velocity. That is more power must be supplied to insure that the entire movement is fast enough so that even the slowest units satisfy acceptable specification limits for access time. The extra power dissipated in these conventional systems results in more power dissipation as heat in the servo coil which is located in a sealed capsule. Because the capsules are sealed, excess heat dissipation in them is a serious problem which can hasten the demise of various components of the head disk assembly.

The capsule must be sealed so that flying dust and smoke particles do not interfere with the head assembly. The heads in disk drives "fly" only 10-20 microinches above the disk surface such that even a cigarette smoke particle can interfere with this flying.

Accordingly, a need has arisen for a head positioner system for a disk drive which utilizes controlled acceleration profiles during both the acceleration and deceleration portions of the trip to prevent excess heat dissipation in the servos. Further, there is a need for a positioning servo which precisely controls the time for a seek to be completed. Precise time control enables predictable seek times to be specified in unit specifications.

SUMMARY OF THE INVENTION

There is disclosed a positioning apparatus for positioning a magnetic head in a disk drive comprising: the magnetic head to be positioned; a positioning servo for positioning the head; and, a driver circuit for driving the positioning servo by controlling the position of the head as a function of time. Head position is controlled as a function of time in accordance with a predetermined profile or schedule of position data versus time. The profile also defines both the velocity and acceleration as a function of time throughout the seek movement. The driver circuit compares the actual position of the head to the predetermined profile to generate an error signal based upon the time difference. The predetermined profile contemplates controlled acceleration at all times during the seek, i.e., the acceleration is constant and positive during the first portion of the seek and constant and negative during a second portion of the seek. For seeks of any length greater than a predetermined number of tracks, the acceleration is constant during a first portion of the seek, the acceleration is zero during a middle portion of the seek, and the acceleration is constant and negative during the last portion of the seek.

The servo driver of the positioning apparatus utilizes a midpoint counter which stores data loaded by a microprocessor regarding the length of a particular seek. The midpoint counter counts signals related to track crossings generated by nonvolatile memory driven by a counter to determine when the midpoint of a seek is reached whereupon a midpoint signal is generated. The seek is started when a counter control circuit starts a data counter counting the count up mode. The counter data outputs serve as the address signals for the memory which stores the profile data. Two data outputs from the memory carry pulses resulting from the stored profile data. The spacing between these pulses decreases as time goes by until the midpoint signal is generated. One of the pulse trains has twice as many pulses as the other, and is used by the midpoint counter to determine when the midpoint of the seek has been reached. The other pulse train is used by a phase comparator which compares it to signals indicating the times of actual track crossings. The time difference between the scheduled times for track crossing and the actual times of track crossings are converted to error signals which drive a servo amplifier. The servo amplifier drives the servo arm of the head disk assembly.

A standard track crossing detector circuit is used to supply the signal indicating the times of actual track crossings.

There is also disclosed a method of positioning a magnetic head servo assembly comprising comparing the times of actual track crossing to scheduled times for track crossings according to a predetermined profile of acceleration and generating an error signal to drive a servo assembly in accordance with the predetermined acceleration profile.

Detailed Description of the Preferred Embodiment

Figure 1:
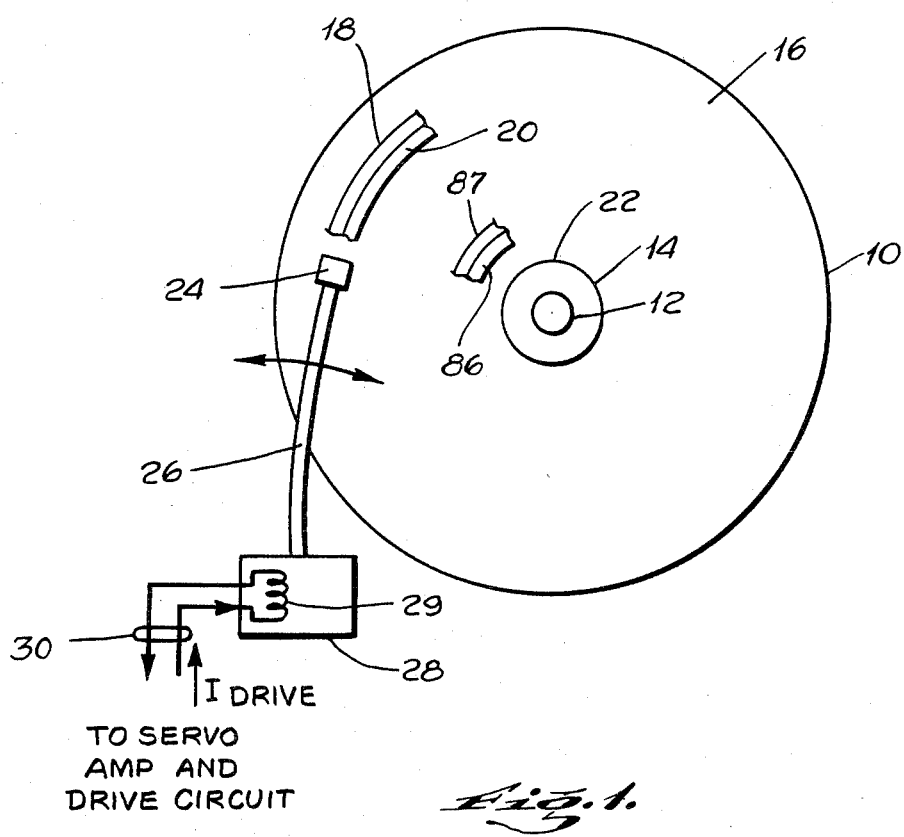
FIG. 1 is a diagram of a typical magnetic storage disk for a computer.

FIG. 1 shows a diagram of a typical magnetic storage disk for storage of magnetically encoded data. The disk 10 is typically constructed of a metallic substrate covered by a magnetic oxide similar to the oxide on audio tape as is well known in the art. The disk is fitted over a spindle 12 which spins the disk at high speed. There is a special landing area 14 on the surface of the disk the purpose of which will be explained later. The entire disk surface is covered by magnetic oxide, but user stored data tracks are found only in the area 16 between the landing zone and the edge of the disk (actually a guard band, not shown, exists at the edge of the disk). A plurality of data tracks such as the data tracks 18 and 20 are defined across the area 16. That is, the entire surface between the edge of the disk 10 and the edge 22 of the landing zone is covered with tracks upon which magnetic data can be stored. The tracks are not separated by any blank oxide regions.

A magnetic head 24 is mounted on a servo arm 26 which servo arm is driven by a servo unit 28 containing a servo coil 29. The moveable element of the servo coil 29 in the servo unit 28 is mechanically coupled to the moveable arm 26 such that when the servo coil 29 is driven with currents of various magnitude and polarity, the moveable arm 26 is moved radially toward or away from the spindle 12 at an acceleration defined by the magnitude of the current in a wire pair 30.

The magnetic head 24 floats above the oxide surface of the disk at a height of approximately 10-20 micro inches. When the disk is shut down, the servo unit 28 is driven to move the magnetic head 24 to the landing zone 14 where it comes to rest after the disk stops spinning. The structural details and operation of head-disk assemblies such as are used in the invention are well known to those skilled in the art.

Each track of data on each disk lies in what is called a "cylinder" and is assigned a specific cylinder number. Typically, multiple data storage disks are placed on the spindle 12 in stacked fashion. Magnetic oxide areas such as the area 16 are located on both sides of each of the disks. Each side of each disk has one or more magnetic read heads such as the magnetic head 24. All of these heads are mechanically linked together on one moveable servo arm which is symbolized by the servo arm 26 in FIG. 1. The servo coil 29 moves the servo arm 26 such that all the magnetic heads are moved in unison. The other disks and magnetic heads are not shown in FIG. 1 for the sake of simplicity.

Figure 2:
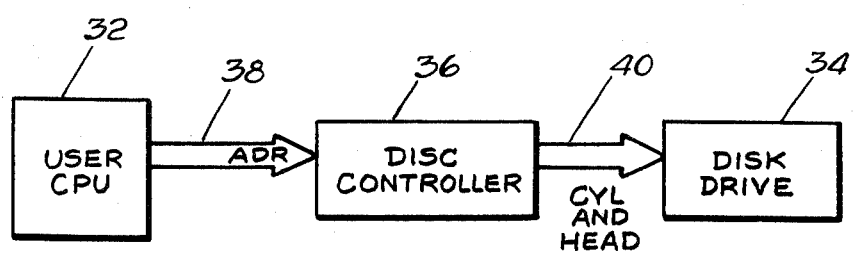
FIG. 2 is a typical user system utilizing a disk drive.

Referring jointly to FIG. 1 and to FIG. 2, there is shown a typical computer system which utilizes a disk drive for mass data storage. A user CPU 32 executes application programs. While executing these programs, the CPU 32 typically needs data stored on a disk drive 34. The user CPU 32 then sends the address of the desired data to a disk controller 36 via an address bus 38. The disk controller 36 converts the address to a cylinder number and a head number and specifies the cylinder and head of the desired data on a bus 40 coupled to the disk drive 34. The cylinder number corresponds to the track number of the desired track and the head number specifies which of the heads dedicated to each of the data storage disks is to be activated. When the proper head is activated the data on the desired track on the designated surface of the designated disk can be successfully read. It is the purpose of the servo amplifier and drive circuitry in the disk drive 34 controlling the servo unit 28 (FIG. 1) in the disk drive 34 to direct the magnetic heads on the servo arm 26 in the disk drive 34 to the proper cylinder. The selection of the proper head is a function of other circuitry in the disk drive unit 34 not pertinent to the invention.

Because the user CPU 32 is operating at a very fast rate, measured in the millions of instructions per second, the need for rapid access to data stored on the disk drive 34 is apparent. Therefore access times i.e. the time it takes for the servo amplifier drive circuitry to move the magnetic head to the proper cylinder on track number must be very short. Further, because the magnetic heads such as the head 24 float so closely to the surface of the magnetic disk, it is normal for the disks such as 10 and the servo unit 28 to be hermetically sealed inside a capsule thereby preventing any dirt, dust, smoke or other foreign object from entering the area near the spinning disks. Because the servo arm 26 must be moved rapidly, over a distance of several inches, substantial currents flow in the servo coil drive lines 30 to the servo coil 29 inside the servo unit 28. The amount of power dissipated in the servo coil 29 is related to time to the fourth power such that small decreases in the amount of time in which an access is performed magnify the power consumed in the servo coil to achieve the faster time by a large amount relative to the decrease in access time. That is, if the servo arm 26 is to be moved more rapidly, more power must be supplied to the servo coil 29. More power translates into more heat dissipated inside the sealed enclosure, which can lead to premature system failure. It is important therefore that the time it takes to complete a seek, i.e., a movement from the present track to the desired track, be kept as short as possible, but that the power consumed in making the movement also be controlled.

Figure 3:
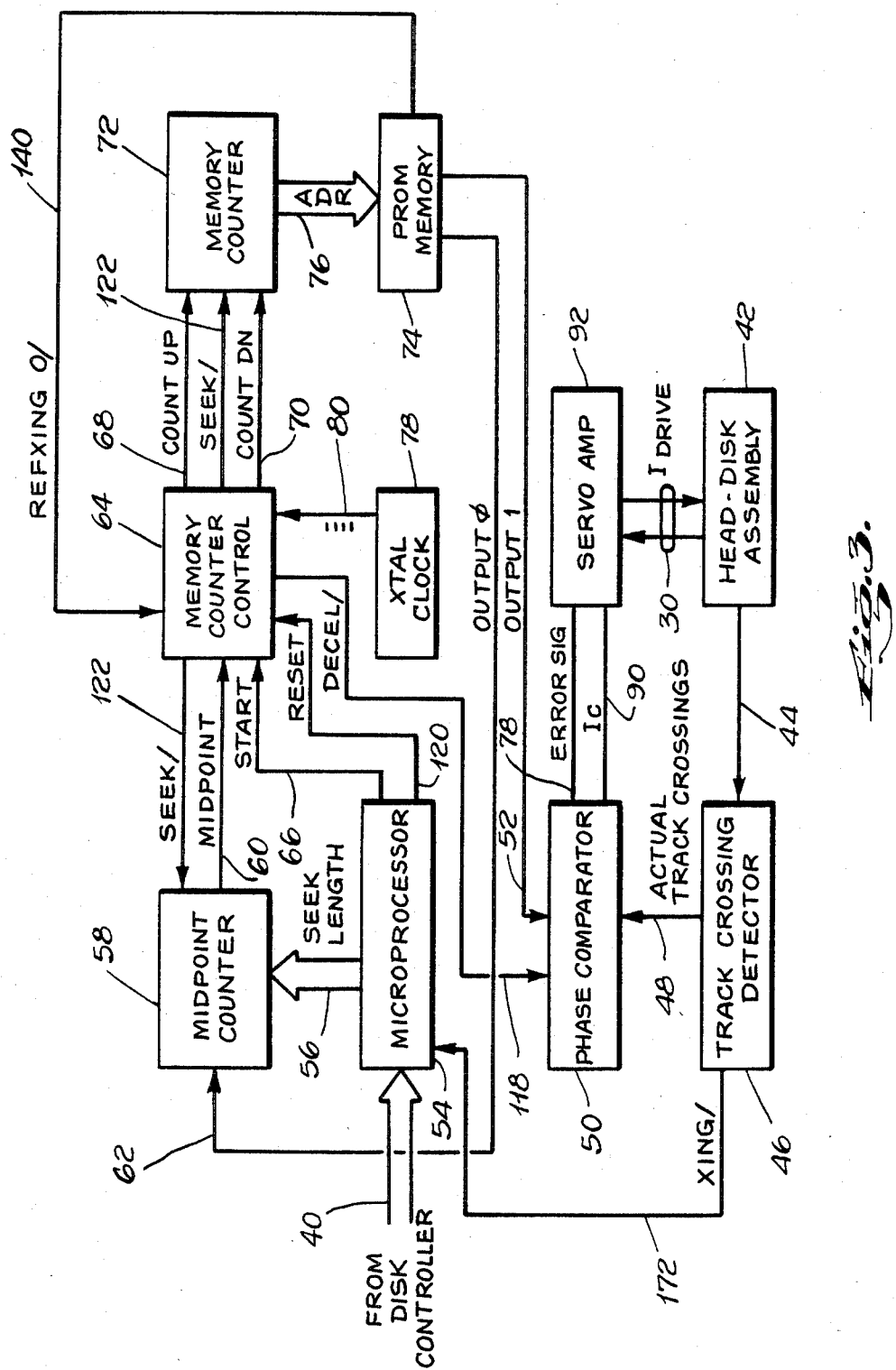
FIG. 3 is a block diagram of the magnetic head positioning system.

Referring to FIG. 3 there is shown a block diagram of the inventive magnetic head positioning system for a disk drive. A head-disk assembly 42 contains the servo coil 29, the magnetic heads such as the head 24, and the servo arm 26. The head-disk assembly 42 also contains a read only servo head (not shown) and a servo disk (also not shown) for generating track position data as is well known in the art. The mechanical design for the head-disk assembly 42 utilizing the read only servo head and servo disk are well known to those skilled in the art and will be represented symbolically herein. The read only servo head and the servo disk serve as a master unit to which all the other heads and disks are slaved. That is, the servo disk spins on the same spindle as the data disks such as the disk 10 in FIG. 1. The read only servo head is mechanically ganged to the moveable arm 26 and the other magnetic heads such as the head 24 such that the magnetic head assembly moves as a unit.

The servo disk has a plurality of odd and even tracks recorded thereon with specific odd and even patterns. The servo tracks correspond in number to the number of tracks on each surface of each data disk. A unique odd data pattern is recorded on the odd tracks and a similar but slightly different data pattern is recorded on the even data tracks. The purpose of these odd and even data patterns is to allow detection of actual track crossings using the standard technique in the industry called "dibit" recording. That is, as the servo head moves across the dedicated servo disk the dibit recording patterns on the odd and even tracks generate specific signals in the servo head. These signals are directed on a wire 44 to a conventional track crossing detector 46. The track crossing detector monitors the signals on the wire 44 and distinguishes between them to determine when each odd and even track on the servo disk has been crossed. The design of the track crossing detector is conventional except for one circuit which will be described in more detail later. Briefly, the track crossing detector has a gated peak detector which is gated so as to look for the difference in the odd and even dibit recorded data pattern on the odd and even tracks. By detecting the difference in the patterns, the track crossing detector can supply information to the microprocessor 54 enabling it to count the number of tracks being crossed.

Because the servo read only head is ganged to the other magnetic heads on the data bearing disks, the track crossing detector 46 can output actual track crossing signals since every track crossed on the servo disk corresponds to a track crossed on the data disks by each of the magnetic heads.

The actual track crossing signals are output on the wire 48 to a phase comparator 50. The purpose of the phase comparator 50 is to compare the actual track crossing signals on the wire 48 to the signals on a wire 52 representing scheduled track crossings. That is, the signals on the wire 52 indicate the scheduled times at which each succeeding track is supposed to be crossed in accordance with stored data defining a profile of position versus time. This profile precisely defines the amount of time a particular seek will take, and the acceleration which will exist in the head disk assembly 42 at all times during the seek. There are no calculations of velocity based upon position data from the head disk assembly 42 in the system of FIG. 3.

As noted above, the disk drive 34 receives cylinder and head data on a bus 40 from the disk controller 36. In FIG. 3, this cylinder and head data is read by a microprocessor 54. The microprocessor 54 converts the cylinder and head data to a seek length data word which is output on a bus 56. The seek length word is derived by the microprocessor by subtracting the current track location from the desired track location. Fundamentally, however, the microprocessor 54 determines where the head and the head disk assembly 42 is presently located from data it stores and continually updates and subtracts the present location from the cylinder data which is received from the disk controller 36 to derive the difference. The difference in tracks becomes the seek length word on the bus 56.

The seek length word is loaded via the bus 56 into a midpoint counter 58. The purpose of the midpoint counter 58 is to determine the midpoint in the seek movement and to signal that event by generating a signal on a wire 60. Both the microprocessor 54 and the midpoint counter 58 are conventional in design. Any microprocessor which is capable of performing the functions described herein will be satisfactory to implement the system described herein. Further, any midpoint counter design which is capable of being loaded with an initial count and counting down to zero from that count will be adequate. The midpoint counter 58 has its count down input coupled to a wire 62 carrying pulses related to track crossings as will be explained in more detail below. Upon the occurrence of each pulse on the wire 62, the midpoint counter 58 decrements its count by one. When the count reaches zero the borrow output becomes active thereby generating the midpoint signal on a wire 60.

A memory counter control circuit 64 is coupled to the wire 60 carrying the midpoint signal and is coupled to a wire 66 from the microprocessor 54. Upon generating the seek length word on the bus 56, the microprocessor 54 also generates a START signal on the wire 66 which causes the memory counter 64 to gate a clock signal on a line 80 from a clock 78 through to a wire 68 as a COUNT UP signal. When the memory counter control circuit 64 receives the midpoint signal on the wire 60, the clock pulses on the line 80 are gated through as the COUNT DOWN signal on a wire 70.

The COUNT UP and COUNT DOWN signals are coupled to the count up and count down inputs, respectively, of a memory counter 72. The memory counter 72 counts up or down in response to the COUNT UP and COUNT DOWN signals.

The count output of the memory counter 72 is used as an address signal for a memory 74 which stores the predetermined position versus time profile data. That is, the count outputs of the counter 72 are coupled by an address bus 76 to the address inputs for the memory 74. The memory 74, in the preferred embodiment, is a programmable read only memory (PROM). However, a read only memory (ROM) or an electrically alterable read only memory (EAROM) could also be used. In fact, a random access memory (RAM) could also be used if provision is made to prevent the volatility of the memory from destroying the profile data upon shutting off power to the unit or upon accidental loss of power.

The memory 74 consists of a series of sequential address locations where each address location has at least two data bit slots to store data bits. These address locations are sequentially accessed as each succeeding address appears on the address bus 76 controlled by the memory counter 72. As each address location is accessed and its data is retrieved, the data is output on the two wires 62 and 52 as, respectively, the OUTPUT 0 and OUTPUT 1 signals. That is, as the address 000 appears on the address line 76, the contents of the memory location 000 are retrieved and placed upon the wires 62 and 52 as the signals OUTPUT 0 and OUTPUT 1, respectively. Likewise, as the memory counter 72 increments to the count 001, the count on the address bus 76 causes the data contents of the location 001 in the memory 74 to be retrieved and directed onto the wires 62 and 52 as the signals OUTPUT 0 and OUTPUT 1, respectively.

The desired position versus time profile involves a constant positive acceleration, i.e., a linear increasing velocity with time, during a first part of the seek movement. During a second part of the seek movement, the acceleration is constant and negative leading to a linearly decreasing velocity of the magnetic head with time. Obviously, with tracks evenly spaced on the disks, a linearly increasing velocity will cause track crossings to occur more rapidly as time goes by. That is, the actual track crossing signals will become spaced closer together with increasing time, i.e., if each track crossing is represented by a pulse, the pulses will become spaced closer together as time goes by.

To insure that this acceleration profile is achieved, the data stored in the memory 74 indicating scheduled track crossings on the line 52 will be compared by the phase comparator 50 against data indicating the actual track crossings as indicated by the signals on the wire 48. The difference between the times of arrival for the pulses indicating actual track crossings versus the times of arrival of the pulses on the wire 52 indicating the scheduled times for those track crossings will be converted by the phase comparator 50 to an error signal on a line 78.

Figure 4:
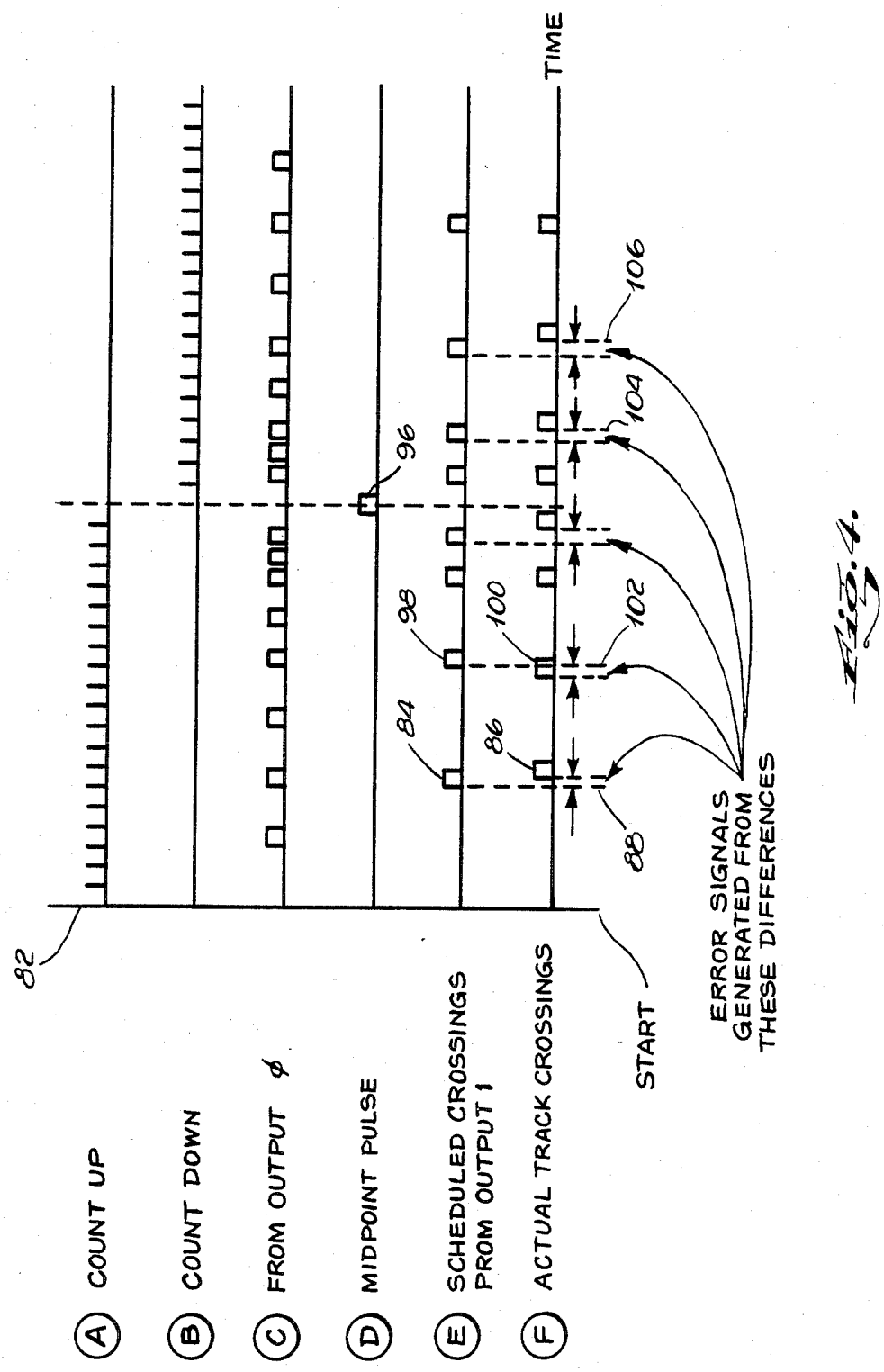
FIG. 4, consisting of A-F, is a timing diagram showing the relationships of the various signals in the magnetic head positioning of the system of FIG. 3.
Figure 5:
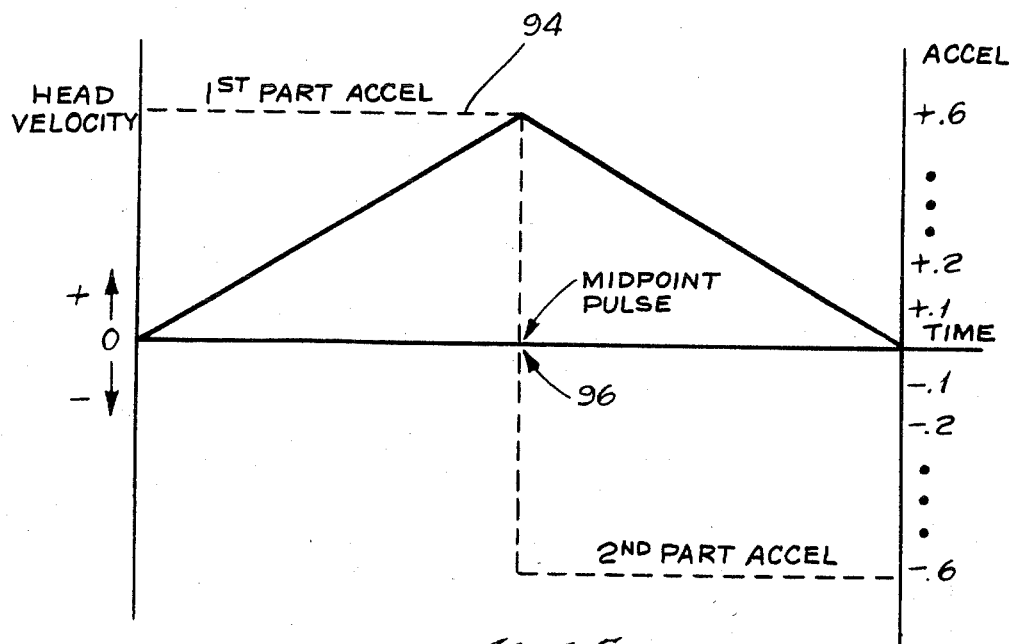
FIG. 5 is a diagram of the acceleration profile describing the data stored in the memory 74.

This concept can be better understood by reference to FIG. 4 which shows a timing diagram illustrating the relationships between various signals in the magnetic head positioning system and by reference to FIG. 5 which is a diagram of the position/velocity/acceleration versus time profile describing the data stored in the memory 74.

FIG. 4, lines A and B, show the relationship between the COUNT UP and the COUNT DOWN pulses on the wires 68 and 70 respectively in FIG. 3. The COUNT UP and COUNT DOWN signals are generated by a crystal-controlled clock 78 in FIG. 3. The clock 78 generates a pulse train on the wire 80 with an 18 microsecond period. The pulses on the wire 80 are gated by the memory counter control 64 to either the wire 68 or to the wire 70. The MIDPOINT pulse on the wire 60 and the START signal on the wire 66 control whether the memory counter control 64 gates the clock pulses to the wire 68 or to the wire 70. When the START signal on the line 66 occurs, pulses are gated to the wire 68 as the COUNT UP signal. This start event is symbolized by the line 82 in FIG. 4, and is also represented by the origin at zero time in FIG. 5. The curve for the magnetic head velocity shown in FIG. 5 obviously also defines the position versus time for the magnetic head and the acceleration which the magnetic head is undergoing during the first and second parts of the seek movement. It can be seen that the head velocity is linearly increasing from the time of the occurrence of the START pulse on the line 66 until the time of occurrence of the midpoint pulse 60. The MIDPOINT pulse is illustrated on line D of FIG. 4 at a time 96. The linearly increasing head velocity during the first half of the seek represents a constant positive acceleration for the magnetic head. That is, the acceleration is the first derivative of the head velocity, i.e., the slope of the velocity curve from the origin to the midpoint at the time 96 in FIG. 5. Since the slope is constant and positive, the acceleration is constant and positive. The pulse trains on the lines C and E in FIG. 4 represent the data outputs from the memory 74 on the wires 62 and 52, respectively.

Since the average velocity equals distance traveled divided by the time it took to travel that distance, and since the tracks are equally spaced on the data storage and servo disks, it will be apparent that the spacing between the pulses representing times for track crossings will be linearly decreasing as is shown on line E.

The pulse spacings on the lines C and E and the acceleration profile represented by FIG. 5 are illustrative only. Any other physically possible acceleration profile could be defined if the aforementioned heat considerations are accounted for and the data stored in the memory 74 in FIG. 3 could be adjusted accordingly to implement that acceleration profile.

The acceleration profile is implemented by the data in the memory 74 by selectively storing logic ones at addresses which have linearly decreasing numbers of blank memory locations between them. For example, an acceleration profile might be stored by writing a logic zero into the data bit one slot of each the first 63 addresses. A logic one would then be stored in the 64th address data bit one slot. After the memory counter 72 has been incremented 64 times by the COUNT UP pulses on the wire 68, the address 64 would exist on the bus 76. Data in the 64th address would then be retrieved and placed on a data output lines 62 and 52. The data bit one slot data would be put on the wire 52 as the output one signal. There is also a data bit zero slot at every memory location. The data in these slots will be explained later and are coupled to the wire 62 as the OUTPUT 0 signal. The event of placing the data bit one data on the wire 52 is represented by the pulse 84 on the line E of FIG. 4.

The pulse 84 represents the scheduled time for the crossing of the first track in the seek movement. For example, referring momentarily to FIG. 1 assume that the disk 10 represents the servo disk and the magnetic head 24 represents the servo read only head. Further, assume that the servo read only head 24 is located on track 18 when the seek movement starts, and that the target track is a track 86 closer to the spindle 12. The track 20 then represents the first track that will be crossed during the seek movement, and the track 87 is the last track which will be crossed during the seek movement before the head 24 is centered on the target track 86. The pulse 84 in FIG. 4 then represents the scheduled time for the magnetic head 24 to cross the track 20.

A pulse 86 on line F of FIG. 4 is generated when the servo head 24 actually crosses the track 20. The pulse 86 is generated by the track crossing detector 46 in FIG. 3, and is directed along the wire 48 to the phase comparator 50. Meanwhile, the pulse 84 on the wire 52 has arrived somewhat earlier at the phase comparator 50. The difference in the arrival times between the pulses 84 and 86 is represented in FIG. 4 by the time interval 88. This time difference 88 is converted by the phase comparator 50 in a conventional manner to an error signal 78. In the preferred embodiment, the conventionally designed phase comparator 50 converts the time difference 88 into a pulse of a fixed magnitude which has a duration proportional to the time difference 88. This variable duration pulse is converted to an error signal current on the wire 78 which is centered about zero but which has a magnitude which depends upon the duration of the pulse. The phase comparator 50 also supplies a constant current signal on a wire 90 coupled to a servo amplifier 92. The constant current on the wire 90 causes the constant acceleration which is desired during the first portion of the seek movement. This constant acceleration is represented by the dotted line 94 in FIG. 5 between the origin and the time 96 of the midpoint pulse.

The servo amplifier 92 sums the constant current on the wire 90 and the varying current of the error signal on the wire 78 into a single drive current directed on a servo coil drive pair of wires 30 to the servo coil 29 in FIG. 1. The block 42 in FIG. 3 represents the servo drive assembly 28 in FIG. 1, the servo coil 29, the servo arm 26, the servo read only head and the servo disk as well as the magnetic data heads such as 24 in FIG. 1 and the magnetic data storage disks such as disk 10 in FIG. 1, all of which are conventional and well known.

After crossing the first track 20, the moveable arm 26 will continue to accelerate and the servo read only head will cross the next track in its path toward the target track 86 but in a shorter time. Therefore, the scheduled time for this crossing must be sooner than the scheduled time for the crossing of the first track 20. In the data pattern of the memory 74, this scheduled second track crossing is implemented by leaving fewer blank addresses between the 64th address location which generated the pulse 84 on line E in FIG. 4 and the next location in which a logic one will be stored. For illustration purposes, assume that the desired acceleration profile calls for a next track crossing in half the time that it took to make the first track crossing. In such a case, the next logic one would be stored in the data bit one slot at an address location 32 locations away from address location 64, i.e., in address location 96. Therefore, 31 blank address locations would be accessed by the memory 74 in response to the address on the bus 76. When the address 96 was reached, the logic one stored in the data bit one position of that location would be accessed and directed onto the wire 52 to the phase comparator 50. This event is represented by a pulse 98 on line E of FIG. 4.

For illustration purposes assume that the next actual track crossing, represented by the pulse 100 on line F of FIG. 4, occurred slightly sooner than scheduled. This slight error in arrival time is represented by the time difference 102 in FIG. 4. This time difference 102 is converted by the phase comparator 50 into an error signal on the line 78 which is of a different sign, and perhaps of a different magnitude, compared to the error signal which was generated from the time difference 88 in FIG. 4. The servo amplifier 92 combines the new error signal on the wire 78 with the constant current signal on the wire 90 to adjust the drive current on the servo coil drive wires 30 to the servo coil 29.

This pattern of ever-decreasing blank memory locations between locations in which logic ones are stored continues through a predetermined number of location in the memory 74. At the time of occurrence of the MIDPOINT pulse 96, the memory counter control circuit 64 changes the gating of the clock pulses on the wire 80 to direct them onto the wire 70 as the COUNT DOWN pulses as illustrated on line B of FIG. 4. The memory counter 72 then starts supplying addresses on the bus 76 which are decremented by one address location upon the occurrence of each succeeding clock pulse. The memory 74 then begins accessing data at the address locations from which it just finished accessing data but in the reverse order. That is the memory 74 halts accessing at the highest address which was achieved before the occurrence of the midpoint pulse and begins retracing its steps back to address location zero.

This retracing by the memory 74 results in the scheduled crossing pulses illustrated on line E of FIG. 4 to the right of the dotted line representing the time 96 of the occurrence of the midpoint pulse.

In the preferred embodiment, the acceleration and deceleration profiles are equal but of opposite signs. The deceleration profile is represented in FIG. 5 by the portion of the dotted line 94 to the right of the time 96 of occurrence of the midpoint pulse. In other embodiments, it would be possible to define a profile wherein the acceleration is constant but of unequal amplitude during different portions of the seek movement. Further, other embodiments may shift to deceleration at some point other than at the midpoint, e.g., at a point closer to the target track. The manner of accomplishing these other acceleration profiles will be apparent to those skilled in the art given the above description of the invention.

As the magnetic head decelerates by virtue of the reversal in polarity of the drive current on the wires 30, the actual track crossing signals illustrated on line F of FIG. 4 becomes spaced further apart. For a constant negative acceleration, the actual track crossing signals on the wire 48 arrive at the phase comparator 50 at intervals which are increasing in an approximately linear manner. This situation is illustrated on line F of FIG. 4 to the right of the time of occurrence of the midpoint pulse. The time differences 104 and 106 in FIG. 4 represent the differences in the times of arrival of the actual track crossing signals versus the scheduled times for those track crossing; these time differences are again converted to error signal currents on the wire 78.

A midpoint pulse at the time 96 is generated by using the pulse train on the wire 62 shown on line C of FIG. 4 to cause a midpoint counter 58 to count down to zero. The pulse train on the line C of FIG. 4 represents a pulse train with twice as many pulses as the pulse train on the line E of FIG. 4. The pulses on the line C also have linearly decreasing time intervals between the individual pulses as is the case for the pulse train shown on line E. That is, for every pulse that is shown on line E, two pulses are found within the same interval on line C. The pulse train on the line C is defined by logic ones stores in the data bit zero position of each memory location and is output on the wire 62 coupled to the count down input of the midpoint counter 58. Wire 62 is coupled to the data zero bit of the data bus of the memory 74. Thus, as each address location is accessed, the data in the zero bit position stored at that address location is directed onto the wire 62. The pulse train shown on line C of FIG. 4, therefore, is implemented by storing logic ones in the data zero bit position of each address location containing a logic one represented by the pulses on the line E of FIG. 4, and, in addition, by storing additional logic ones in the data zero bit position in memory address locations halfway between each address location storing a one represented by the pulses on line E. The result of having twice as many pulses in the pulse train of line C on the wire 62 is to cause the midpoint counter 58 to count down to zero halfway through the seek movement.

Figure 6:
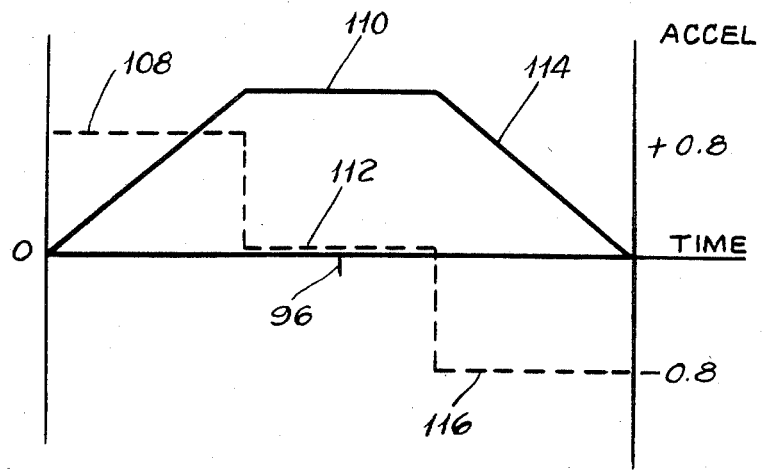
FIG. 6 shows an acceleration profile for seeks longer than a certain length.

Referring to FIG. 6 there is shown an acceleration profile for seek movements longer than a predetermined length. In the preferred embodiment, a profile such as the one shown in FIG. 6 is utilized for seek movements of greater than 512 tracks. Although the acceleration profile of FIG. 6 shows an acceleration different from that of the profile of FIG. 5, this is for illustration purposes only. In the actual operation, once the acceleration profile is determined and stored in the memory 74, the acceleration will be the same for the positive and negative acceleration portions of both profiles, and the profile of FIG. 6 will occur only where the seek length is greater than 512 tracks. For these longer seek movements, it is seen from FIG. 6 that a constant, positive acceleration will exist during the first portion of a seek movement. This constant, positive acceleration is illustrated by the portion 108 of the dashed line representing the acceleration profile. The velocity profile is represented by the solid line in FIG. 6. Upon reaching a predetermined velocity, the velocity profile flattens out and a constant velocity is maintained as represented by the portion 110 of the solid line in FIG. 6. Because the velocity is constant, the acceleration is zero as represented by the portion 112 of the dotted line.

At the time 96 at which the midpoint pulse occurs, the memory 74 halts its forward progress and begins to retrace its steps in accessing all the data locations back to address zero. The acceleration profile of FIG. 6 is implemented in the data pattern of the memory 74 by changing the spacing of the logic ones stored in the memory after a certain address is reached. That address is selected by calculating the time which it takes for the servo arm 26 to reach a certain velocity and dividing that time by the 18 microsecond cycle time of the clock 78. For all address locations above that calculated address, the number of blank address locations between the logic ones remains a constant. The deceleration portion of the seek movement represented by the segment 114 of the solid line in FIG. 6 commences when the memory 74 again reaches the address at which the spacing between the logic ones changed to a constant number. Thereafter the spacing between the pulses on the wire 52 again begins to increase linearly in the same manner described in connection with FIG. 5. This deceleration is represented by the portion 116 of the dotted line in FIG. 6. The occurrence of a midpoint pulse on the wire 60 is communicated not only to the memory counter control circuit 64 but also to the microprocessor 54. During the constant velocity portion 110 of the profile in FIG. 6, the error signal on the wire 78 is adjusted to maintain constant velocity while the constant current signal on the wire 90 is forced to zero to maintain zero net acceleration of the servo arm 26.

In a preferred embodiment, the acceleration and deceleration selected for the constant acceleration portions of the profile is 1.5 tracks per millisecond per millisecond. The track spacing in a preferred embodiment is 680 track per inch or 268 tracks per centimeter.

Figure 7:
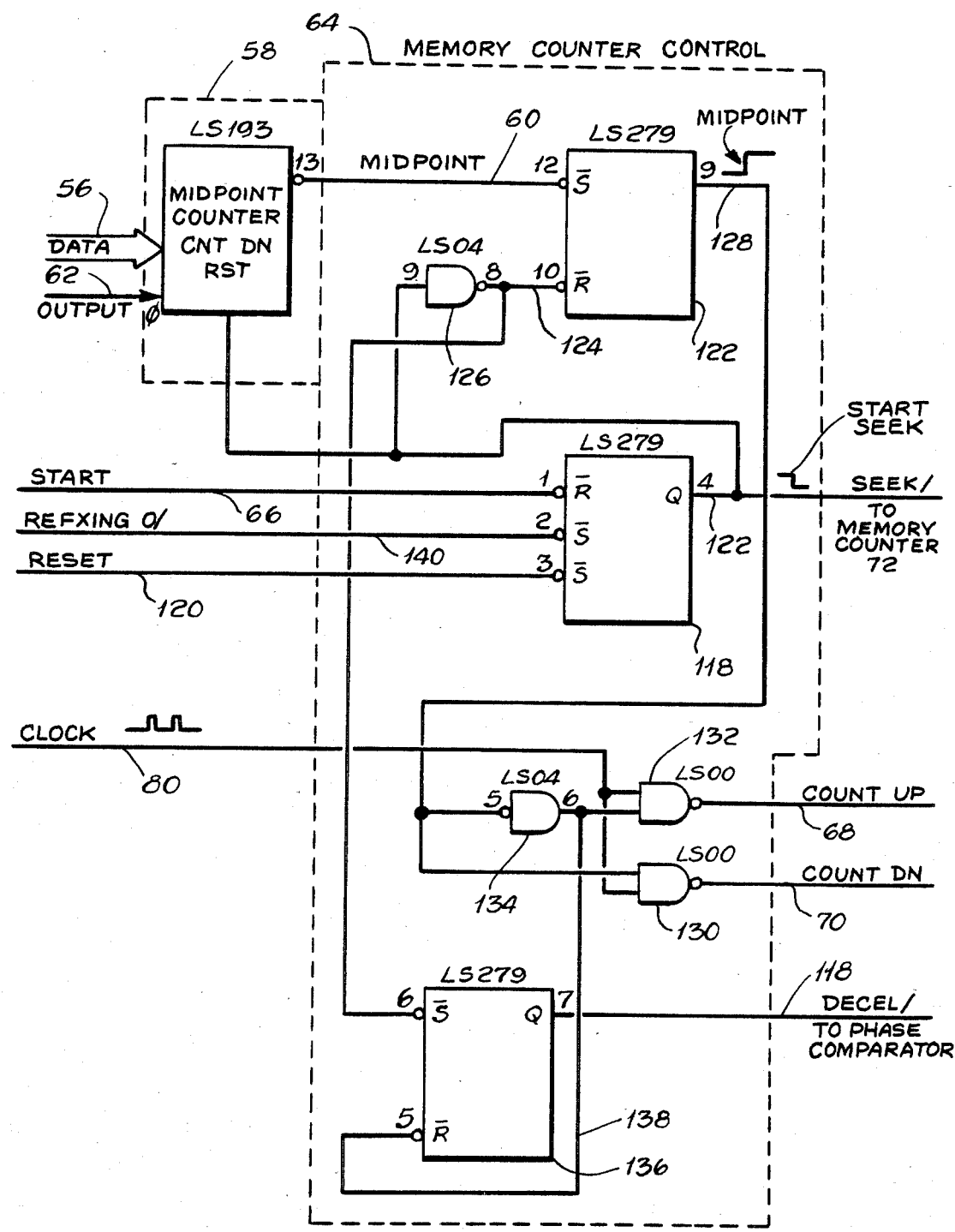
FIG. 7 is a logic diagram for the memory counter control.

Referring to FIG. 7 there is shown a logic diagram for the memory counter control 64 and FIG. 3. Referring jointly to FIGS. 3 and 7, prior to starting a seek, the micro processor 54 sets a flip flop 118 in the memory counter control system 64 by generating a low going RESET pulse on a line 120 coupled to a set input of the flip flop 118. This maintains the Q output of the flip flop 118 at a logic high level, which Q output is coupled to a wire 122 and which defines a SEEK/ signal. The wire 122 is coupled to the reset input of the midpoint counter 58 thereby preventing this counter from counting in either direction while SEEK/ is high. The SEEK/ signal on the line 122 is also coupled to the reset input of the memory counter 72 in FIG. 3 to hold it in a reset state.

Upon receiving the cylinder and head data for the target track from the disk controller 36 in FIG. 2, the micro processor examines one of its internal registers to determine the cylinder at which the magnetic heads are presently located and then the microprocessor computes the difference between the present cylinder location and the target cylinder/track location. This difference is loaded into the midpoint counter 58 as the SEEK LENGTH data on the bus 56. After the seek length has been loaded, the microprocessor 54 resets the flip flop 118 by generating a low going START pulse on the wire 66 coupled to the reset input of the flip flop 118. This causes the SEEK/ signal to go low on the wire 122 thereby enabling the midpoint counter 58 to start counting down and the memory counter 72 to begin counting up. Each time a pulse on the wire 62 is received at the midpoint counter 58, the count is decremented by one.

A flip flop 122 has its reset input 124 coupled to the SEEK/ on the wire 122 through an inverter 126. During the time prior to the start of the seek, the wire 122 is at a logic one level which holds the reset input 124 low thereby maintaining the flip flop 122 in a reset state. Thus the Q output coupled to a wire 128 is maintained in a logic zero condition. This logic zero signal on the wire 128 is coupled to one input of NAND gate 130 whose output is the COUNT DOWN signal on the wire 70. The logic zero signal on the wire 128 is also coupled to an input of a NAND gate 132 through an inverter 134. The output of the NAND gate 132 is the COUNT UP signal on the wire 68.

When the midpoint counter 58 has counted down to zero at the midpoint, the midpoint pulse on the wire 60 is generated and directed to a set input of the flip flop 122. This causes the Q output and the signal on the wire 128 to go to a logic one level which reverses the logic levels at the inputs to the NAND gates 130 and 132. The other inputs to the NAND gates 130 and 132 are jointly coupled to the clock pulses coming in on the wire 80. The result is as follows.

Prior to reaching the midpoint of the seek movement, the logic zero level on the wire 128 at one input to the NAND gate 130 effectively blocked transmission of the clock pulses on the wire 80 through to the output as the countdown signal 70 because of the truth table or logical function of a NAND gate. However, because of the inverter 134, the logic zero level on the wire 128 is converted to a logic one level at the input to the NAND gate 132 thereby allowing the output COUNT UP signal on the wire 68 to follow the transitions caused by the clock pulses on the wire 80. That is, the clock pulses on the wire 80 are transmitted through the NAND gate 132 as the COUNT UP signals on the wires 168 but are blocked by the NAND gate 130. When the midpoint is reached, a logic one level appears on the wire 128 and the situation becomes reversed such that the clock pulses on the wire 80 are transmitted through the NAND gate 130 as the COUNT DOWN pulses on the wire 70 but are blocked by the NAND gate 132.

The phase comparator 50 in FIG. 3 must be notified when the midpoint of the seek movement has been achieved so that it can reverse the polarity of the constant current signal on the wire 90 to the servo amplifier 92. This reversal of polarity causes the servo amplifier 92 to reverse the polarity of the drive current on the servo coil drive pair 30 thereby causing deceleration of the servo arm 26. The phase comparator 50 is signaled that the deceleration portion of the seek movement should be started by the signal DECEL/ on the wire 118. The signal DECEL/ is generated by a flip flop 136. This flip flop has a set input coupled to the reset input 124 of the flip flop 122. Therefore, the flip flop 136 is held in a set state by a logic one SEEK/ signal on the wire 122 of the flip flop 118. When a seek movement starts, the logic one on the wire 122 changes to a logic zero which is coupled to the set input of the flip flop 136 as a logic one thereby enabling the flip flop 136 to be reset. The flip flop 136 is reset when the midpoint of the seek movement has been reached by the transition of the signal on a wire 138 from the output of the inverter 134 and coupled to an active low reset input of the flip flop 136 makes a transition from logic one to logic zero. Since the inverter 134 is driven by the wire 128 from the flip flop 122, this event occurs at the midpoint of the seek movement. Q output of the flip flop 136 on the wire 118 is the signal DECEL/. This DECEL/ signal drops to a logic zero level at the midpoint, which causes the phase comparator 50 to change the polarity of the constant current on the wire 90.

When the seek movement has been completed and the memory 74 has cycled back to the address seek location, a signal REFIXING 0/ on a wire 140 is activated. This signal is coupled to a set input of the flip flop 118 thereby setting the signal SEEK/ on the wire 122 to a logic one level. This resets the memory counter 72 to zero and resets the midpoint counter 58 to zero.

Figure 8:
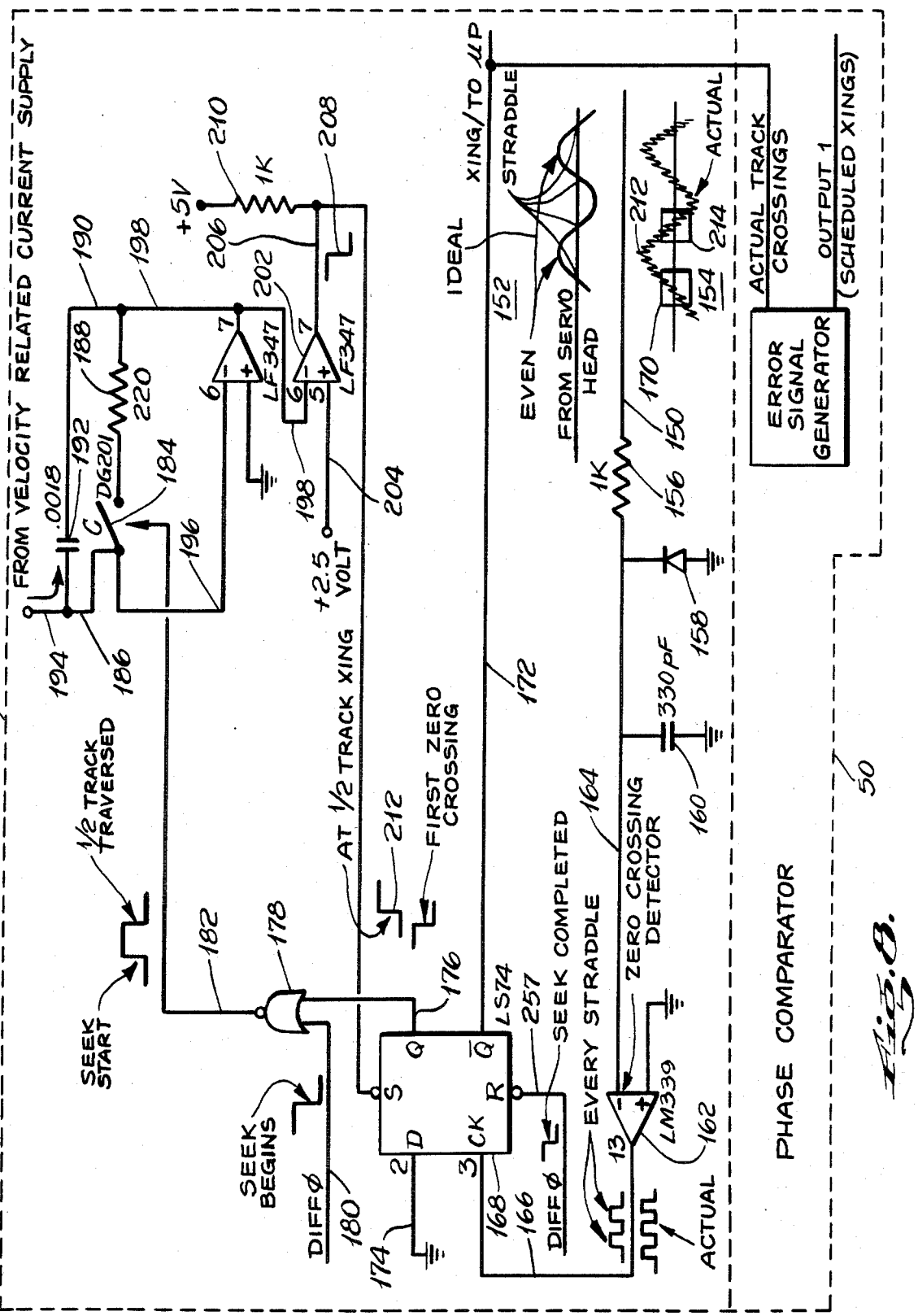
FIG. 8 is a detailed block diagram of the time domain noise filter used in the track crossing detector of FIG. 3.

Referring to FIG. 8, there is shown a logic diagram for a time domain noise filter which is used in the track crossing detector 46 of FIG. 3. The function of the noise suppressor is to eliminate noise effects in the track crossing signals from the servo head such that the actual number of track crossings can be accurately counted without the noise in the signal from the servo head causing a false count to occur. The microprocessor must be accurately informed as to exactly how many tracks on the servo head have been crossed so that it may determine when to shift from the seek mode to the "on track" mode to locate the center of the target track. That is, when the heads have been moved to within one-half track of the target track, the microprocessor will force a transition to the "on track" mode wherein the magnetic heads are centered precisely on the target track.

Therefore, the track crossing detector 46 must do a precise job in detecting when each even and each odd track on the servo disk is crossed. This is somewhat difficult since the signal from the servo read only head is superimposed upon a great deal of ambient noise.

The signal from the servo read only head (not shown) enters the track crossing detector 46 on a line 150 in FIG. 8. As is well known in the "dibit" recording art, the ideal signal from the servo read only head is generally as shown at 152 in FIG. 8. That is, when the servo read only head is centered over an even track, the signal on the line 150 will be a positive sinusoidal lobe such as the lobes labeled "even" on the curve 152. On the other hand, when the servo read only head is centered over an odd track, the signal on the line 150 will be a negative sinusoidal lobe, such as the lobe labeled "odd" on the curve 152. When the servo read only head is exactly straddled between an even and odd track, it is well known in the art that the servo head signal will cross zero. Therefore, each time the servo read only head moves from a position centered over an even track toward a position centered over an odd track, there will be a position when the servo read only head is exactly straddling the two tracks and a zero crossing will occur. Those straddle points will be the zero crossing points on a curve shown generally at 152, and, as is well known in the art, these zero crossing points will correspond to the actual data heads being centered over actual data tracks.

Such is the ideal situation. However, in real life, the signal on the line 150 from the servo read only head looks more like the curve generally illustrated at 154. It will be noted at the zero crossing points that noise spikes cause several zero crossings, indicating several points spaced very closely in time when the magnetic head is theoretically exactly straddling an even and odd track. Obviously, the servo head actually straddles the tracks only at one time. That is, this multiple straddle time situation cannot actually occur, and there is only one point in time when the magnetic head is exactly straddle. However, the electronic circuitry of the track crossing detector 46 must distinguish between these multiple zero crossings and pick only one zero crossing as the time designated for the straddle point. To do this, it picks the first one and blocks out all the rest for one quarter cycle.

To detect these zero crossing points, the signal on the line 150 is transmitted through a group of filtering components comprising a resistor 156, a diode 158, and a capacitor 160 to the inverting input of a differential amplifier 16 which has its noninverting input coupled to ground as a reference source. Thus each time the signal on the line 164 crosses zero, the amplifier 162 changes state to generate a transition on an output wire 166. The wire 166 is coupled to the clock input of a flip flop 168. Ideally, the amplifier 162 will generate a low-to-high transition each time the signal on the line 150 crosses zero. The noise at the zero crossings, such as that noise illustrated within the box 170 of the actual signal coming from the servo head illustrated generally at 154, will cause many such low-to-high going pulses on the output wire 166. The object of the circuitry in the track crossing detector illustrated in FIG. 8 is to distinguish between those pulses on the line 166 which indicate actual straddle points and those which are extraneous and caused by unwanted noise.

The actual track crossing signals will be communicated to the microprocessor on the line 172 as the signal XING/.

The filtering is done as follows: The wire 166 is coupled to the clock input of the LS74-type flip flop which has its D input coupled to ground via a line 174. Thus, the first time the line 166 makes a low-to-high transition with the line 174 grounded, a logic zero is latched onto the Q output coupled to the line 176. Thereafter, subsequent low-to-high transitions on the wire 166 continue to clock logic zeros at the D input, i.e., the line 174, to the Q output line 176. However, the line 176 is already latched at a logic zero state and no change is observed. The wire 176 is coupled to one input of a NOR gate 178 which has its other input coupled to a line 180 carrying a signal DIFF0 from the microprocessor 54. As will be described later, the microprocessor at the beginning of the seek movement sets the signal DIFF0 to a logic zero condition. This causes the NOR gate 178 to invert the signal on the line 176 and apply it to its output line 182. Thus the line 182 makes a low-to-high transition at the start of the seek movement.

The low-to-high transition on the line 182 causes a semiconductor switch 184 of the DG201-type to open, thereby disconnecting a shorting circuit from bypassing a capacitor 192. The shorting circuit is comprised of the wire 186, the resistor 188, and the wire 190. A wire 194 connects the capacitor 192 to a current source which generates a current which is proportional to velocity.

That is, as the head velocity increases, the magnitude of the current on the line 194 also increases. When the switch 184 opens, the capacitor 192 begins to charge.

The node 196 of the capacitor 192 then begins to rise in voltage in relation to the opposite node 198 of the capacitor. The node 196 is coupled to the inverting input of a differential amplifier 200 which has its output connected to the node 198 and is of the LF347 variety. The output of the amplifier 200 is coupled to the inverting input of another differential amplifier 202 which has its noninverting input coupled to a positive 2.5 volt reference source via a line 204. Thus, as the voltage on the capacitor 192 continues to rise, the voltage on the inverting input of the amplifier 202, i.e., the node 198, continues to rise. When the voltage on the node 198 reaches a positive 2.5 volts, the output node 206 of the amplifier 202 makes a high-to-low transition as illustrated at 208.

The output node 206 of the amplifier 202 is coupled to the active low set input of the flip flop 168. This set input is also coupled through a 1K resistor 210 to a positive 5 volt voltage source which serves to hold the set input of the flip flop 168 at a solid logic one level until the amplifier 202 definitely asserts a logic zero at the set input via the wire 206. The capacitor 192 and the amount of current on the line 194 are sized such that 2.5 volts is reached approximately one-half track crossing after the seek movement starts. Further, the magnitude of the current on the line 194 is increasing linearly at the same rate as the velocity. Therefore, as each succeeding track is crossed in a smaller amount of time, the voltage on the capacitor 192 reaches 2.5 volts in the same smaller amount of time which happens to be approximately one-half track later.

The effect of this voltage comparison of the rising voltage on the capacitor is to effectively block out any low-to-high transitions on the line 166 until one-half track later when the flip flop 168 is set by the high-to-low transition on the wire 206 coupled to the set input of the flip flop 168. At the time the flip flop 168 is set and the Q output coupled to the line 176 is raised from the logic zero to the logic one state, the flip flop 168 is primed to clock another logic zero through to the output. This is shown generally at 212. This low-to-high transition on the line 176 is inverted in the NOR gate 178 and becomes a high-to-low transition on the output line 182. This logic zero on the line 182 causes the semiconductor switch 184 to close, thereby draining the capacitor 172 through the resistor 188. When the next low-to-high transition on the line 166 comes to the clock input of the flip flop 168, a zero from the B input coupled to the line 174 is again clocked to the Q output on the line 176 and the process starts over again. However, the next low-to-high transition on the line 166 is most likely the next zero crossing since all zero crossings for the first half track of the signal illustrated at 154 were blocked until the approximate peak at 212. It is unlikely that when the flip flop 168 is set by the amplifier 202 that any further zero crossings will occur until the next straddle point illustrated generally at 214. Again only the first zero crossing will clock the flip flop 168, which will thereafter be blocked from causing any further high-to-low transitions on the Q output 176 until one-half track later, when the flip flop 168 is set by the action of the amplifier 202.

The error signal generator in the phase comparator 50 must be able to generate an error signal on the line 78 in FIG. 3 which changes in magnitude for the same time difference, such as the differences 88 and 102 in FIG. 4. The servo amplifier 92 has a certain loop gain which is measured in volts per track width. As the magnetic heads pick up speed, the time differences, such as 88 and 102, can be the same in terms of absolute time, but represent 10% error in one case and 90% error in another case. For example, assume that the time differences 88 and 102 are both one microsecond. The time difference 88 might then represent a 10% error, but the time difference 102 might represent a 90% error because the magnetic head is travelling much faster when the track crossing 100 is made than when the track crossing 86 is made.

The error signal generator in FIG. 8 must convert the time differences, such as 88 and 102, into voltages of different magnitudes to correct these different magnitude errors. That is, the time difference 88 must be converted into an error signal to correct a 10% error, and the time difference 102 must be converted into an error signal big enough to correct a 90% error. If the loop gain of the servo amplifier 92 is 10 volts per track, then to correct a 10% error requires a one volt error signal on the line 78, but to correct a 90% error would require an error signal of 9 volts.

To do this, the error signal generator in FIG. 8 includes an integrator structure similar to the one in the track crossing detector utilizing the capacitor 192, switch 184 and the amplifier 200.

The escalating current in the line 194 is again applied to the capacitor analogous to the capacitor 192. The switch analogous to the switch 184 is controlled by the time difference such that the capacitor charges up during the intervals, such as 88 and 102, etc., in FIG. 4. However, because the current on the line 194 is much higher during the interval 102 than during the interval 88, the capacitor analagous to the capacitor 192 charges to a higher voltage during time 102 than during time 108. The error signal is thus adjusted in magnitude to account for different head speeds.

Figure 9:
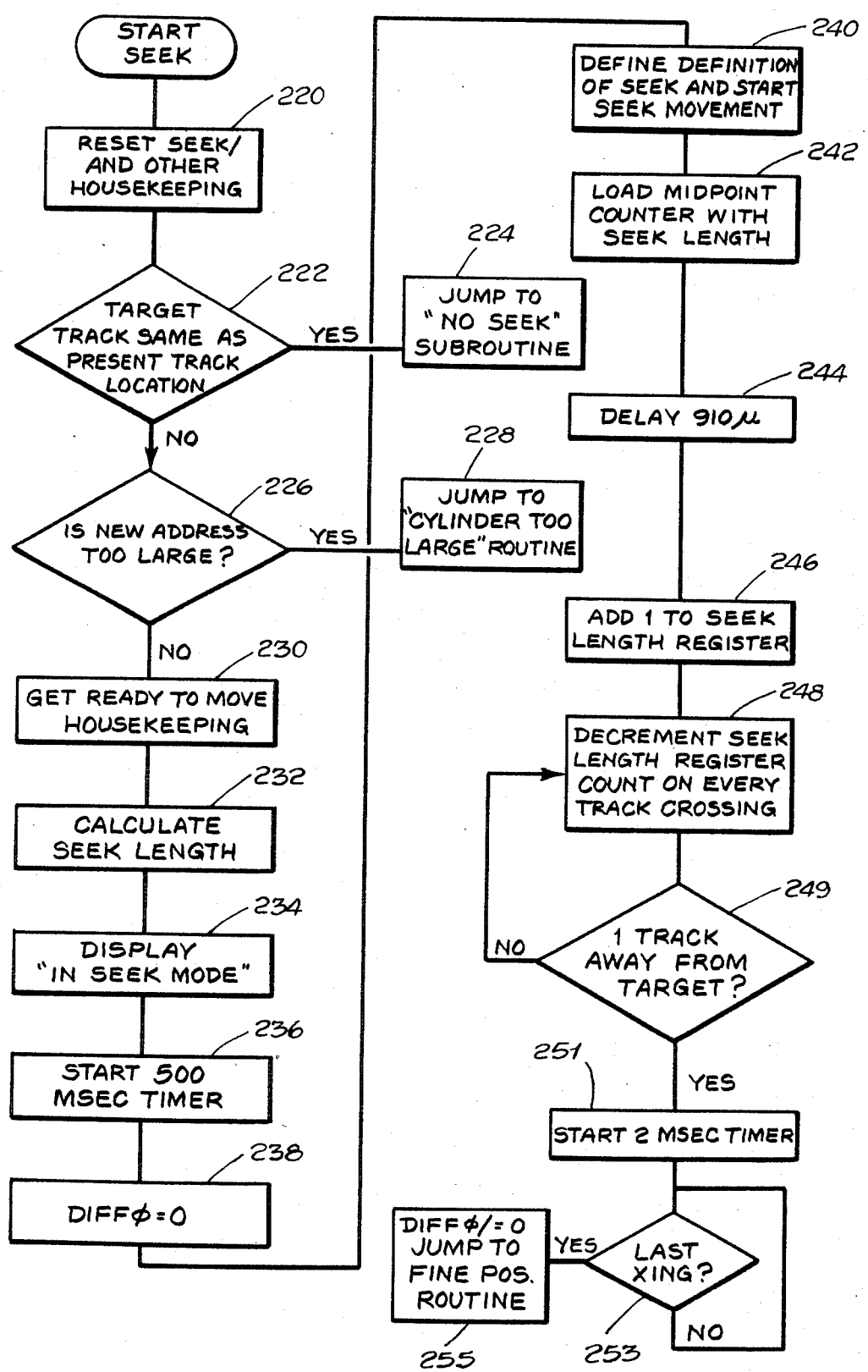
FIG. 9 illustrates the algorithm used by the microprocessor of FIG. 3.

Referring to FIG. 9 there is shown the algorithm used by the microprocessor 54 in FIG. 3. The first task that the microprocessor must perform is to reset the signal SEEK/ and perform other housekeeping functions. Resetting the signal SEEK/ causes the midpoint counter 58 and the memory counter 72 in FIG. 2 to be reset and held at zero count.

Next, the microprocessor 54, after having received the cylinder and head designation data from the disk controller 36 in FIG. 2, determines whether the target track is the same as the present track location where the heads are located as symbolized by the clock 222. If it is the same location, the microprocessor 54 jumps to a subroutine indicating that no seek is required, as symbolized by the block 224. If the target track location is not the same as the present track location, the microprocessor examines whether the new address is too large, which would indicate that some mistake was made. This is symbolized by the question block 226. If the cylinder number is too large, there has been some error in the system, and the microprocessor 54 jumps to a subroutine symbolized by the block 228 to indicate the presence of this error.

If the address is not too large, the microprocessor 54 moves to another housekeeping routine which is not relevant to the seek movement, symbolized by block 230.

After performing these housekeeping routines, the microprocessor calculates the seek length. This is done, as symbolized by the block 232, by subtracting the cylinder of the target track from the present track location to determine the number of tracks which must be crossed. The microprocessor 54 then displays an "in seek mode" message as symbolized by the block 234, and starts a 500 ms timer as symbolized by the block 236. The 500 millisecond delay is needed by the analog circuitry in the head positioner apparatus for reasons which are not relevant to the invention. After the 500 ms timer is started, the microprocessor 54 lowers the signal DIFFØ to the logic zero condition, as symbolized by the block 238. This causes the NOR gate 178 in FIG. 8 to function as previously described.

The microprocessor then defines the direction of the seek movement, and starts the seek movement by issuing the correct signals to the various parts of the system involved in the movement. One of the first steps in starting the seek movement is symbolized by the block 242 wherein the seek length is loaded into the midpoint counter 58. Thereafter another 910 microsecond delay is timed out as symbolized by the block 244 for reasons which are not pertinent to the invention.

The block 246 represents the step of adding one to the seek length register, which is an internal register in the microprocessor 54 which stores the number of tracks which must be crossed for the seek movement. The reason for this addition of one to the seek length has to do with the transition between the seek mode and the "on track" mode which will soon become apparent.

Block 248 in FIG. 9 represents a monitoring loop by the microprocessor of the signal XING/ from FIG. 8 to count actual track crossings. The seek length register is decremented by one each time the signal XING/ occurs. The microprocessor continually checks to determine how many tracks away from the target track it is as indicated by the number in the seek length register. This action is symbolized by the decision block 249.

When the microprocessor determines that it is in fact one track away from the target track, it starts a 2 ms timer which is symbolized by the block 251. The microprocessor then begins to monitor for the track crossing signal XING/ which will indicate that the last track has been crossed. This is symbolized by the decision block 253 in FIG. 9. When the last track crossing signal has been received, the microprocessor 54 turns to a routine symbolized by the block 255. There the signal DIFFØ/ is set at a logic zero. Referring momentarily to FIG. 8, it is seen that this signal DIFFØ/ on a line 257 is coupled to the reset input of the flip flop 168. When this signal goes to a logic zero level, the flip flop 168 is held at a reset condition and no further transitions can appear on the Q output line 176. This completes the seek movement, and the microprocessor then jumps to a fine positioning routine to go into the "on track" mode.

Although the invention has been described in terms of the preferred embodiment herein, it will be apparent to those skilled in the art that numerous modifications can be made without departing from the true scope and spirit of the claims appended hereto. All such modifications are intended to be included within the scope of those claims.

What is claimed is:

1. A positioning apparatus for a magnetic head comprising:
   a magnetic head to be positioned during a seek;
   a positioning servo for positioning said magnetic head; and
   a driver for driving said positioning servo by controlling the position of said head as a function of time.

2. An apparatus as defined in claim 1 wherein said driver stores a predetermined profile of position data versus time.

3. An apparatus as defined in claim 2 wherein said drive compares the actual position of said head to said predetermined profile of position data versus time and generates an error signal based upon the difference.

4. An apparatus as defined in claim 2 wherein said predetermined profile requires controlled acceleration at all times during said seek.

5. An apparatus as defined in claim 4 wherein said acceleration is substantially constant and positive during a first portion of said seek and substantially constant and negative during a second portion of said seek.

6. An apparatus as defined in claim 5 wherein said positioning servo includes a servo coil for moving said head and wherein said driver supplies a substantially constant current of a first polarity during a first portion of said seek and supplies a substantially constant current of a second polarity during a second portion of said seek.

7. An apparatus as defined in claim 6 wherein said substantially constant current is increased or decreased by an error signal current to maintain the predetermined position versus time profile through said seek.

8. An apparatus as defined in claim 7 wherein said error signal is derived by comparing the difference in time between first time marks representing desired times of track crossings and second times marks generated in response to receipt of said midpoint signal from said midpoint counter means;
   a memory means having address inputs coupled to the outputs of said counter means for storing in sequential address locations data defining a predetermined schedule for track crossings for seeks of any length and for outputting said data sequentially in response to the count signals at said address inputs and for supplying said data to said midpoint counter;
   a track crossing detector means coupled to the head assembly for signaling the times of actual track crossings;
   a phase comparator means for comparing data from said memory means regarding the times of schedules track crossings to data from said track crossing detector regarding the times of actual track crossings and for generating an error signal in accord with the difference; and
   a servo amplifier for driving the magnetic head servo assembly upon actual track crossings.

9. An apparatus as defined in claim 2 wherein said driver contains a memory for storing predetermined data defining a predetermined sequence of time marks indicating times of desired track crossings during said seek.

10. An apparatus as defined by claim 9 wherein said memory is addressed by an up/down counter driven by a crystal oscillator to generate profile data at the outputs of said memory indicating the precise times certain tracks are to be crossed.

11. An apparatus as defined in claim 10 further comprising a midpoint detector for signaling when the midpoint of said seek has been reached.

12. An apparatus as defined in claim 11 further comprising means for receiving said midpoint signal and for causing said up/down counter to begin counting down to cause said memory to reverse the sequence of presentation of profile data.

13. An apparatus as defined in claim 2 wherein the supply line voltage to said positioning apparatus will not substantially effect the position versus time profile of the head movement during a seek.

14. An apparatus for positioning a magnetic head in a disk drive comprising:
 a magnetic head;
 means for positioning said magnetic head in response to a drive signal; and
 means for generating said drive signal in accordance with a predetermined profile of desired magnetic head position versus time including means for determining the actual magnetic head position and means for comparing the actual head position versus the desired head position at particular times and for changing said drive signal in response to the difference between the desired position and the actual position.

15. An apparatus as defined in claim 14 wherein said predetermined profile requires predetermined, substantially constant, positive, controlled acceleration during a first portion of said seek and the same predetermined substantially constant but negative acceleration during a second end portion of said seek.

16. A positioning apparatus for a magnetic head servo assembly in a disk drive having a micro-processor interface with a user device for a magnetic comprising:
 a midpoint counter means for storing data regarding the length of a particular seek and for counting signals related to track crossings to determine and generate a midpoint signal when the midpoint of a seek has been reached;
 a counter means for counting up in response to a count up signal and counting down in response to a count down signal;
 a counter control means for generating said count up signal to cause said counter to count up in response to a start signal from said microprocessor and for generating said count down signal to cause said counter to count down.

17. A method of positioning a magnetic head servo assembly in a disk drive comprising the steps of:
 comparing times of actual track crossings to scheduled times for track crossings according to a predetermined profile of acceleration; and
 generating an error signal to drive said servo assembly in accordance with the predetermined acceleration profile.

18. A method of positioning a magnetic head servo assembly comprising:
 storing data regarding the length of a seek and counting data regarding scheduled track crossings to determine the midpoint of the seek;
 counting up commencing upon initiation of a seek and generating address signals from the count;
 retrieving using said address signals profile data regarding scheduled track crossings;
 sensing actual track crossings;
 comparing the times of actual track crossings to the scheduled times from said profile data for track crossings and generating an error signal porportional to the difference;
 positioning said head servo assembly in accordance with said error signal.

* * * * *

UNITED STATES PATENT AND TRADEMARK OFFICE
CERTIFICATE OF CORRECTION

PATENT NO. : 4,547,822

DATED : October 15, 1985

INVENTOR(S) : Stewart C. Brown

It is certified that error appears in the above–identified patent and that said Letters Patent are hereby corrected as shown below:

Column 14, Line 22, please correct "amplifier 16" to read "amplifier 162."

Signed and Sealed this

Fourth Day of November, 1986

[SEAL]

Attest:

DONALD J. QUIGG

*Attesting Officer*     *Commissioner of Patents and Trademarks*